United States Patent [19]

Parent et al.

[11] Patent Number: 4,847,031

[45] Date of Patent: Jul. 11, 1989

[54] EVAPORATING BOATS CONTAINING TITANIUM DIBORIDE

[75] Inventors: Edward D. Parent, Hamilton, Mass.; Edwin J. Spooner, Exeter; Robert F. Scoledge, Jr., Raymond, both of N.H.

[73] Assignee: GTE Products Corporation, Stamford, Conn.

[21] Appl. No.: 133,776

[22] Filed: Dec. 16, 1987

[51] Int. Cl.$^4$ ............................................. C04B 35/58
[52] U.S. Cl. ...................................... 264/332; 264/37; 264/67; 252/520
[58] Field of Search ...................... 264/37, 36, 332, 67; 252/520

[56] References Cited

U.S. PATENT DOCUMENTS

| | | |
|---|---|---|
| 3,181,968 | 5/1965 | Mandorf ............................. 252/520 |
| 3,256,103 | 6/1966 | Roche ................................ 252/520 |
| 3,544,486 | 12/1970 | Passmore .......................... 252/520 |
| 3,582,611 | 6/1971 | Matheson .......................... 252/520 |
| 3,631,131 | 12/1971 | Kodko ................................. 264/37 |
| 3,813,252 | 5/1974 | Lipp .................................... 252/520 |
| 3,915,900 | 10/1975 | Reinmuth ........................... 252/520 |
| 4,373,952 | 2/1983 | Parent ................................ 252/520 |

*Primary Examiner*—James Derrington
*Attorney, Agent, or Firm*—James Theodosopoulo

[57] ABSTRACT

Self-resistance heated, electrically conductive, refractory evaporating boats containing titanium diboride can be reclaimed for reuse. If there is aluminum adhering to the boats, they are first leached in hot caustic solution to remove the aluminum. After rinsing and drying, the boats are ground to powder which is then screened. The screened powder is used to manufacture new boats.

10 Claims, No Drawings

EVAPORATING BOATS CONTAINING TITANIUM DIBORIDE

This invention concerns self-resistance heated, electrically conductive, refractory evaporating boats. Such boats are commonly used in the evaporation of aluminum and examples thereof are shown in the following U.S. Pat. Nos.: 4,373.952; 4,089,643; 3,915,900; 3,813,252; 3,803,707; 3,582,611; 3,544,486; 3,256,103; 3,181,968; 2,984,807; 2,962,538.

In the normal operation of these boats, an erosion takes place caused by interaction with molten aluminum as well as dissociation and sublimation of the boat constituent materials. In this manner the boat becomes inoperable after only a small amount of the constituent material thus eroded has altered the boat's effective cross section and electrical resistivity. The boat, at this point, is normally discarded and replaced, having been only 10% to 15% consumed.

This invention concerns the recovery and re-use of the boat constituent material. If there is adhering aluminum, the used end of life boats are first leached in a hot caustic (NaOH) solution to dissolve and remove the adhering aluminum. If the boats are reasonably clean of adhering aluminum metal this step may be omitted; however most boats have some residual aluminum collected on the boat ends or middle due to a flooding condition during operation. This results in the accumulation of aluminum encapsulated boat pieces which are resistant to grinding down into powder. The soluble sodium aluminate is sent to a waste neutralization tank. The boats are then neutralized in dilute acid, rinsed and dried. The dried boats are then ground to powder and screened to remove oversize material. This oversize material can include scraps of graphite foil and hard crystalline granules of $AlB_{12}$ or $AlB_2$ which can be non-soluble adherents to the leached material. If desired, the ground powder can be blended with small additions of $TiB_2$ or BN for resistivity adjustment. Evaporating boats are then manufactured from the finished ground powder.

Titanium diboride, $TiB_2$, is a common constituent of the evaporating boats with which this invention is concerned. Other generally used constituents are boron nitride, BN, and aluminum nitride, AlN.

In one example, evaporating boats having the composition shown in U.S. Pat. No. 4,373,952, namely, about 50% $TiB_2$, about 30% BN, about 12% AlN and about 8% tungsten, were collected after their useful life. These boats were generally about 6" long by 1" wide by $\frac{3}{8}$" thick. The boats were placed in a hot 20% NaOH solution until reaction ceased. After the NaOH solution was drained, the boats were immersed in dilute HCl for 24 hours. The HCl was then drained and the boats were thoroughly rinsed with hot water and cold water. The boats were next dried at 150° C. and then fed through a jaw crusher to about a minus $\frac{1}{2}$" mesh size. The crushed material was then autogenous-ground in an Abbe ball mill which was operated for three hours. The advantage to autogenous grinding is that it breaks down the $tiB_2$—BN—AlN composite without breaking down the harder crusts of $AlB_{12}$ and $AlB_2$ which can then be removed by screening. About 55% of the milled material was finer than 4 mesh size, and about 30% was finer than 100 mesh size. The −100 mesh material was vacuum hot pressed at 1975° C. and 3800 psi into a dense billet 4" diameter by 2" thick. From this billet, evaporating boats measuring 3 1/2"× $\frac{1}{2}$"× $\frac{1}{8}$", each containing a milled cavity measuring 2"× $\frac{3}{8}$"×0.04", were made.

One of these boats was used for an evaporation test in a small metallizer. Aluminum wire was fed into the boat at a high feed rate (4.2 g/min/in$^2$). This boat was run for 2 hours with excellent electrical stability under these conditions. The performance and survivability of the test boat was equal in every respect to a standard boat of similar composition made with virgin material.

In a second example, a 13" diameter by 2" billet was similarly hot pressed from a batch of powder made from a larger portion of end of life boats. Test boats of 5"× $\frac{3}{4}$"× $\frac{1}{2}$" size were cut from this billet. Electrical resistivity ran between 700 and 900 micro ohm-cm. These were found to be equivalent in performance to standard (virgin) composition material when run in a commercial metallizer.

In a third example, 6 test boats were cut from a similarly hot pressed billet. The bar sizes cut were 6"×1"×0.438" with a cavity of 5"× $\frac{7}{8}$"×0.094". The resistivity of these bars ranged between 700 and 900 microohm-cm. One of these bars had a satisfactory operating life of 11.5 hours after running in a test metallizer chamber at 2.5 g/min/in$^2$ specific feed rate of aluminum wire. The noraml operating lifetime of a standard boat of similar composition is 10 hours.

No $TiB_2$ additions were made to the above material. However additional tests have shown that the resistivity can be modified by additions of $TiB_2$, as follows.

| WEIGHT % $TiB_2$ ADDED TO RECLAIM | RANGE OF RESISTIVITY |
| --- | --- |
| 0 | 700–900 Microohm-cm. |
| 1 | 650–850 |
| 2 | 600–775 |
| 3 | 500–700 |
| 4 | 450–550 |

In a similar manner, the resistivity can be increased by small additions of boron nitride.

The reclaimed powder may also be blended with virgin raw materials selected from the group $TiB_2$, BN, AlN, WB, in any proportions required to produce a pressed material with the required electrical resistivity, wetability by molten Al, machinability and mechanical strength to render it useful as an evaporation boat.

We claim:

1. The method of making an evaporating boat comprising the steps of: collecting self-resistance heated, electrically conductive, refractory, titanium boride containing, evaporating boats at the end of their useful life; grinding the end of life boats to powder; screening the powder; and manufacturing including pressing a self-resistance heated, electrically conductive, refractory, titanium diboride containing, evaporating boat from said screened powder.

2. The method of claim 1 including the step of jaw crushing the boats prior to grinding.

3. The method of claim 2 wherein the crushed boats are autogenous ground.

4. The method of claim 1 wherein the screened powder used to manufacture the boat is less than 100 mesh.

5. The method of claim 1 wherein the screened powder is vacuum hot pressed into a dense billet from which the boat is manufactured.

6. The method of claim 1 wherein the end of life boats also contain boron nitride.

7. The method of claim 1 wherein titanium diboride powder is added to the screened powder in order to reduce the resistivity of the evaporating boat.

8. The method of claim 6 wherein boron nitride is added to the screened powder in order to increase the resistivity of the evaporating boat.

9. The method of claim 6 wherein the end of life boats also contain aluminum nitride.

10. The method of claim 1 including the steps of leaching the end of life boats in hot caustic solution to remove any aluminum that may be adhering to the end of life boats, rinsing and drying the boats.

* * * * *